United States Patent
Dicander

(10) Patent No.: US 10,853,644 B2
(45) Date of Patent: Dec. 1, 2020

(54) METHOD AND SYSTEM FOR DETERMINING POSSIBLE GEOGRAPHIC POSITIONS OF AN ASSUMED UNDETECTED TARGET

(71) Applicant: SAAB AB, Linkoeping (SE)

(72) Inventor: Fredrik Dicander, Mölndal (SE)

(73) Assignee: SAAB AB, Linkoeping (SE)

( * ) Notice: Subject to any disclaimer, the term of this patent is extended or adjusted under 35 U.S.C. 154(b) by 0 days.

(21) Appl. No.: 16/642,862

(22) PCT Filed: Aug. 31, 2017

(86) PCT No.: PCT/SE2017/050867
§ 371 (c)(1),
(2) Date: Feb. 27, 2020

(87) PCT Pub. No.: WO2019/045608
PCT Pub. Date: Mar. 7, 2019

(65) Prior Publication Data
US 2020/0257880 A1    Aug. 13, 2020

(51) Int. Cl.
*G06K 9/00* (2006.01)
*G01C 15/00* (2006.01)
*G01C 7/00* (2006.01)

(52) U.S. Cl.
CPC ....... *G06K 9/0063* (2013.01); *G06K 9/00771* (2013.01); *G01C 7/00* (2013.01); *G01C 15/00* (2013.01)

(58) Field of Classification Search
CPC .... G06K 9/0063; G06K 9/00771; G01C 7/00; G01C 15/00
See application file for complete search history.

(56) References Cited

U.S. PATENT DOCUMENTS

| | | |
|---|---|---|
| 7,005,981 B1 | 2/2006 | Wade |
| 2009/0195401 A1* | 8/2009 | Maroney ............ G06K 9/00335 340/686.6 |
| 2010/0201787 A1 | 8/2010 | Zehavi |

OTHER PUBLICATIONS

International Searching Authority, International Search Report and Written Opinion for International Application No. PCT/SE2017/050867, dated Aug. 31, 2017, (13 pages), Swedish Patent and Registration Office, Stockholm, Sweden.

* cited by examiner

*Primary Examiner* — Yuen Wong
(74) *Attorney, Agent, or Firm* — Alston & Bird LLP

(57) ABSTRACT

A sensor surveillance system (100) and a method for determining possible geographic positions of at least one assumed undetected target (1*a-n*) within a geographic volume of interest (200) is provided, wherein for a first point in time ti the following steps are performed: dividing the geographic volume of interest (200) into sections (10); assuming the existence of an assumed undetected target (1*a-n*) at a geographic position within each section (10); and initiating the creation of a pattern (2) defining at least one possible geographic position of the assumed undetected target, said pattern extends at least partially around the geographic position of the assumed undetected target (1*a-n*); wherein the geographic extension of said pattern is determined based on: the category of the assumed undetected target (1*a-n*); and the amount of time that has passed from the first point in time t1. Further, for a second point in time t2 the following steps are performed: determining geographic locations (205) within said geographic volume of interest (200) from where sensor signals show absence of targets; and removing the pattern (2) from the geographic locations (205) from where sensor signals show absence of targets.

24 Claims, 6 Drawing Sheets

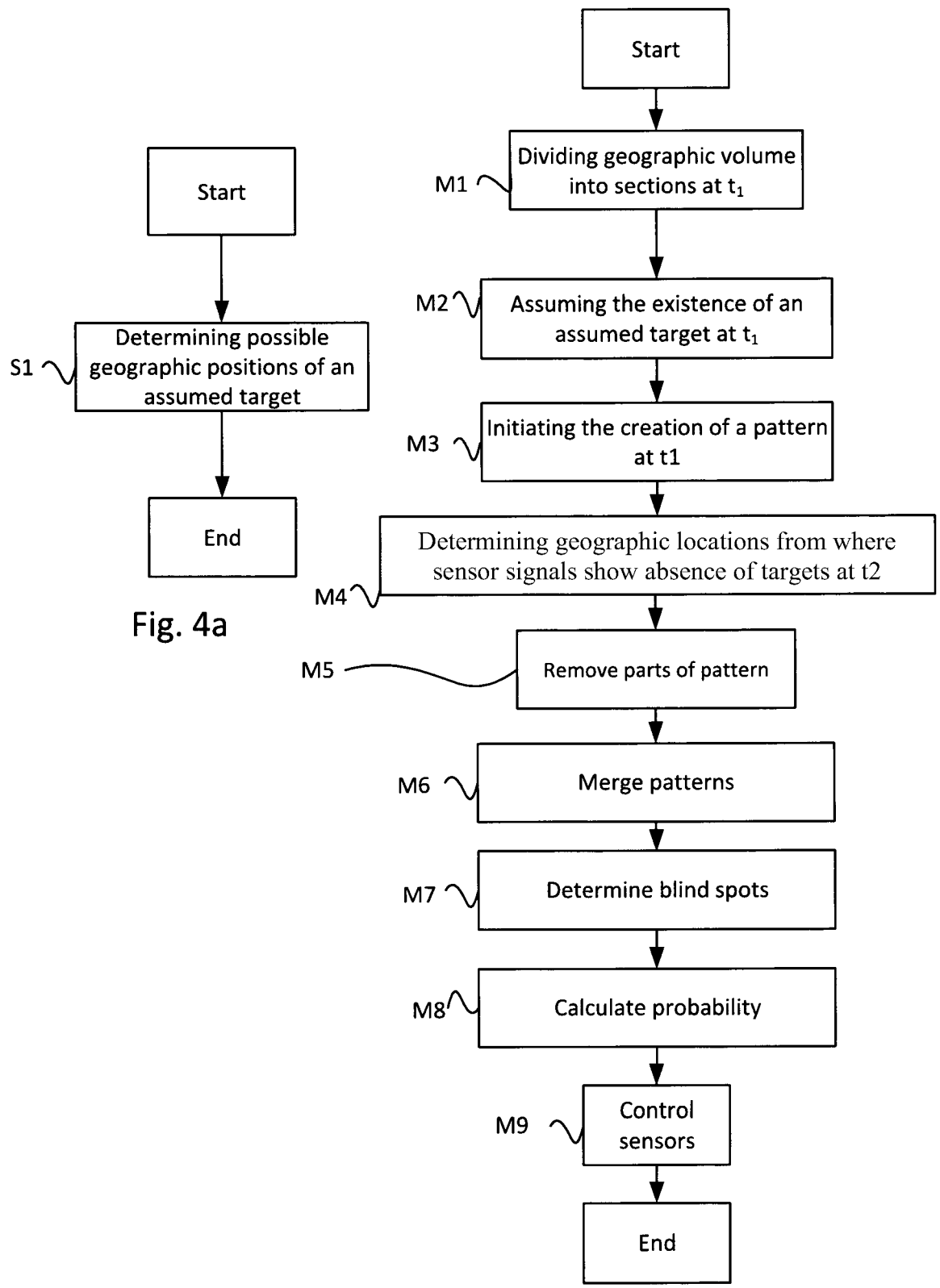

METHOD AND SYSTEM FOR DETERMINING POSSIBLE GEOGRAPHIC POSITIONS OF AN ASSUMED UNDETECTED TARGET

CROSS REFERENCE TO RELATED APPLICATIONS

This application is a National Stage Application, filed under 35 U.S.C. 371, of International Application No. PCT/SE2017/050867, filed Aug. 31, 2017; the contents of which are hereby incorporated by reference in their entirety.

BACKGROUND

Related Field

The described invention is a method and a system for determining possible geographic positions of at least one assumed undetected target within a geographic volume of interest.

Description of Related Art

In order to monitor a certain geographic volume of interest a sensor surveillance system can be arranged to scan said geographic volume of interest. Usually, the sensor surveillance systems comprise a number of sensors of different types. The sensors are arranged to scan certain geographic positions within the geographic volume of interest in order to detect targets in said geographic positions. If a target is detected, it is tracked. It is possible that the sensor will lose track of the target due to for example the terrain in which the target travels, which terrain also may degrade the search performance of the sensor. If a target travels in a forest area for example, some sensors of the sensor surveillance system will not be able to track the target. Once the sensor system has lost track of a target, the target may still reside in the certain geographic volume of interest, undetected. New undetected targets may also enter the geographic volume of interest from outside. For sensor surveillance systems, it is desirable to minimize the volume where undetected targets may reside in a certain geographic volume of interest.

The sensors of the sensor surveillance system are normally not able to scan the whole geographic volume of interest at the same point in time and hence, at a certain point in time, some geographic positions in the geographic volume of interest are not monitored. In the geographic positions which are not monitored, it is possible that a target resides, undetected. There is a need to minimize the geographic positions in a geographic volume of interest, in which geographic positions there is uncertainty whether a target resides or not.

One way to minimize the uncertainty about where undetected targets in a certain geographic volume of interest resides is to add sensors to the sensor system. By adding more sensors to the sensor system, a larger part of the geographic volume of interest will be possible to monitor. However, sensors are expensive and important targets for a possible enemy. A minimized sensor usage may therefore give a higher survivability for the sensor system.

Another way to minimize the number of undetected targets in a certain geographic volume of interest and to minimize the volume where there is an uncertainty whether a target resides or not, is to plan routes of the sensors in order to cover the volume as well as possible at each point in time by using the sensors in the sensor system. The sensors of a sensor surveillance system may be controlled according to a predefined schedule comprising a route for each sensor. In order to use the sensors of the sensor surveillance system in an efficient manner it is important to focus the scanning efforts of each sensor of the sensor system to relevant geographic positions within the geographic volume of interest. The planning/adjustments of the routes of the sensors of the sensor system may be done continuously and/or in a fixed or pre-planned way. The routes may be planned/adjusted depending on a number of factors such as weather conditions, information about targets in a certain geographic position etc. and the threats towards the sensors to maximize sensor performance and sensor survivability. Normally the planning/adjustments of the routes of the sensors are performed manually. To manually plan and adjust the routes of the sensors in a sensor surveillance system requires skill and time from the people involved. Manual scanning planning methods have limitations in how to take previous scanning efforts of for example non-perfect sensor detection and the movements of the targets into account in the planning. Hence, there is a need for improvement in the planning of the sensors of a sensor system in order to optimize the scanning efforts of a sensor surveillance system. One important parameter when planning the sensors of a sensor system in a geographic volume of interest is to determine what geographic positions in the geographic volume of interest to which the scanning efforts should be focused in order to scan the geographic volume of interest in an optimized way.

Hence, there is a need to reduce the costs and increase the survivability of the sensor surveillance systems by reducing the number of sensors required in order to monitor a geographic volume of interest. In addition, there is a need to utilize the sensors of the sensor surveillance system in an optimized way over time in order to improve or optimize the level of surveillance of a geographic volume of interest.

BRIEF SUMMARY

It is an object of the present invention to provide an improved method for determining possible geographic positions of at least one assumed undetected target within a geographic volume of interest. By determining possible geographic positions of at least one assumed undetected target within a geographic volume of interest, and using this information for controlling the sensors of a sensor surveillance system, the scanning of the geographic volume of interest by the sensors of a sensor system may be optimized.

Further it is an object of the present invention to provide an alternative method for determining possible geographic positions of at least one assumed undetected target within a geographic volume of interest. It is also an object of the present invention to provide an efficient method for determining possible geographic positions of at least one assumed undetected target within a geographic volume of interest.

Further, it is an object to provide a tool for force projection.

It is an object of the present invention to provide an improved system for determining possible geographic positions of at least one assumed undetected target within a geographic volume of interest. Further it is an object of the present invention to provide an alternative system for determining possible geographic positions of at least one assumed undetected target within a geographic volume of interest. It is also an object of the present invention to provide an efficient system for determining possible geographic positions of at least one assumed undetected target within a geographic volume of interest.

According to one example, a method for determining possible geographic positions of at least one assumed undetected target within a geographic volume of interest is provided, wherein for a first point in time $t_1$ the following steps are performed: dividing the geographic volume of interest into sections; assuming the existence of an assumed undetected target at a geographic position within each section; and initiating the creation of a pattern defining at least one possible geographic position of the assumed undetected target, said pattern extends at least partially around the geographic position of the assumed undetected target; wherein the geographic extension of said pattern is determined based on: the category of the assumed undetected target; and the amount of time that has passed from the first point in time $t_1$. Further, for a second point in time $t_2$ the following steps are performed: determining geographic locations within said geographic volume of interest from where sensor signals show absence of targets; and removing the pattern from the geographic locations from where sensor signals show absence of targets.

According to one example, the possible geographic position of the assumed undetected target is a position in a three dimensional volume. According to one aspect, the possible geographic position is a position in a two dimensional area.

According to one example, the geographic volume of interest is a three dimensional volume. According to one aspect, the geographic volume of interest is a two dimensional area.

The assumed undetected target may according to one aspect be an airborne object, a land borne object or a waterborne object.

The waterborne object may be arranged to travel on the surface of the water or below the surface of the water.

The section is a geographic volume within the geographic volume of interest. The section is according to one example a volume in three dimensions. According to one example, the section is an area in two dimensions. The dimensions i.e. the size of a section may vary, for example depending on the terrain in a geographic volume, or the geographic position within the geographic volume of interest. According to one example, the dimension of a section is predetermined. At the first point in time $t_1$, the whole geographic volume of interest is divided into sections. For each section, the existence of an assumed undetected target is assumed according to the described method. Hence, the predetermined dimensions/size of a section will affect the number of assumed undetected targets which are assumed to be situated in the geographic volume of interest at the first point in time $t_1$.

According to one example, at the first point in time $t_1$, the creation of one pattern for each assumed undetected target is initiated, wherein the pattern is defining at least one possible geographic position of the assumed undetected target. The pattern is according to one embodiment a pattern in two dimensions. The pattern is according to one embodiment a pattern in three dimensions. According to one embodiment, the pattern extends in at least three dimensions, up to six dimensions.

The category of the assumed undetected target relate according to one example to the type of the assumed undetected target, for example bus, car, submarine etc. and/or the current speed and/or the current acceleration and/or the direction of movement of the assumed undetected target. The type of the assumed undetected target is associated with a certain maximum/minimum speed in which the assumed undetected target can travel and/or a certain acceleration/deceleration rate. According to one example, the category of the assumed undetected target merely comprises information regarding maximum/minimum speed in which the assumed undetected target can travel and/or a certain maximum/minimum acceleration/deceleration rate and/or direction of movement. According to one example the assumed undetected target speed, acceleration and direction of movement is affected by the geographic location of the assumed undetected target. In other words, an assumed undetected target will be able to move at a certain speed and/or with certain acceleration in one geographic position, and with a different speed and/or acceleration in a different geographic position. According to one example, this is due to for example the terrain for a land borne vehicle. According to one example, the assumed undetected targets may be limited in speed, acceleration or direction of movement due to regulations. According to one example the category of the assumed undetected target comprises information regarding a known intention, such as "move north". According to one example the category of the assumed undetected target comprises information regarding a threat, which for example controls the assumed undetected target to stay close to a road. The category of the target will affect the geographic extension of the pattern.

The extension of said pattern is determined based on the amount of time that has passed from the first point in time $t_1$. According to one embodiment, if the assumed undetected target is assumed to be stationary, the amount of time that has passed from the first point in time $t_1$ will not affect the geographic extension of the pattern for said assumed undetected target.

The second point in time $t_2$ is the point in time when sensor signals are collected and used in order to remove or delete parts of the pattern. If a sensor of a sensor surveillance system scans a certain geographic volume, and said geographic volume show an absence of targets, the pattern/s in said certain geographic volume will be removed or deleted. Hence, at the second point in time $t_2$, when parts of the pattern has been deleted, the pattern will only cover possible geographic positions of at least one assumed undetected target within a geographic volume of interest. Since the pattern only covers possible geographic positions of at least one assumed undetected target within a geographic volume of interest, the pattern will provide an accurate overview of possible geographic locations wherein assumed undetected targets may reside. This information may be used in order to optimize the sensor surveillance system in order to scan a geographic volume of interest in an efficient manner. A view of where assumed undetected targets may reside indirectly gives a view of where potential threats may occur, and hence a tool for force projection is provided.

By using the described method, an accurate estimation of a geographic position of an assumed undetected target at a second point in time is achieved.

In the described method signals from sensors in a sensor surveillance system are utilized in order to minimize the pattern. Especially, signals from sensors, wherein the signals comprise information that a target has not been detected are utilized in the described method. According to one example, the geographic extension of the pattern provides an overview of the geographic coverage of the whole sensor surveillance system. By studying the generated patterns, a visualisation of where the sensor surveillance system lacks surveillance or lacks accurate surveillance is achieved. Hence, the method provides for a better decision support for decisions where an overview of the abilities of a sensor surveillance system is a parameter to be considered. According to one example, the method enables an efficient and/or optimized control of the sensors of a sensor surveillance system in a geographic volume of interest. In other words, the method is used in order to control the sensors of a surveillance sensor system in order to optimize the surveillance of a certain geographic volume of interest. According to one example, the sensors of the surveillance sensor system are controlled in order to maximize the coverage of the surveillance of a certain geographic volume of interest.

According to the described method, a pattern is created or generated, wherein the pattern defines at least one possible geographic position of the assumed undetected target at a certain point in time. According to one example the method described above is performed repeatedly, and for each further first point in time t1$i$ subsequent the first point in time t1, new undetected targets are only assumed in sections along the border of the geographic volume of interest.

For each point in time subsequent the first point in time t1, new assumed undetected targets can only enter the geographic volume of interest via the border of the geographic volume of interest. Hence, by only assuming new sections, and thereby new assumed undetected targets, along the border of the geographic volume of interest, an efficient method is created, minimizing the processing of data and generating accurate patterns.

According to one example, a method is provided, wherein, at each point in time subsequent the first point in time $t_1$, the following steps are performed: comparing the properties of each pattern; and merging the parts of the patterns for which the comparison fulfils a predetermined criteria.

According to one example, the pattern itself comprises information regarding speed and/or acceleration and/or direction of movement and a geographic position in each part of the pattern. For each assumed undetected target, a pattern is created. At a certain point in time subsequent the first point in time $t_1$, the patterns may be compared to each other. Each part of each pattern is compared to each other. If one part of a pattern for one assumed undetected target compares with a part of a pattern for another assumed undetected target according to predetermined criteria, the two patterns will be merged in said part. Hence, from that point in time, there will only be one pattern instead of two patterns in that part. In other word, the merged pattern will only comprise information about one assumed undetected target, even if there is a possibility that there are two or more assumed undetected targets with the same speed, direction and acceleration in that part of the pattern. Hence, an efficient and data saving method is provided which presents information in a user friendly manner.

According to one example, a method is provided, wherein a separate pattern is created for each category of the assumed undetected target. According the method described, several assumed undetected targets in different categories may be assumed in each geographic position of each section of the geographic volume of interest. A separate pattern is created for each assumed undetected target and for each assumed category of the assumed undetected target. According to one example, only patterns from assumed undetected targets within the same category are compared to each other and merged if certain criteria are fulfilled.

According to one example, blind spots within the geographic volume of interest are determined based on the created pattern. According to one example, blind spots represent the geographic positions in the geographic volume of interest which are not monitored by sensors. These geographic positions forming blind spots are according to one example derived from the patterns in the geographic volume of interest. To define blind spots gives an accurate and user friendly overview of the sensor surveillance system, especially it provides the user with an overview of where the sensor system does not have coverage. This information can be utilized in order to control the sensors of the sensor surveillance system in order to optimize the scanning of the sensors in the geographic volume of interest. According to one example, the information can utilized in order to be and to show areas where there can be undetected threats in the geographic volume of interest.

According to one example, the geographic extension of said pattern is further based on: the characteristics of the surrounding of the geographic position of the assumed undetected target at each point in time. In other words, the characteristics of the surrounding of the geographic position where the assumed undetected target is assumed to be situated at each point in time affects the geographic extension of the pattern. This is due to for example an assumed undetected target's ability to move in a certain terrain. For example, an assumed undetected target of a certain category may not be able to move in a forest area, and hence, the pattern will not extend in the forest area surrounding the geographic position of the assumed undetected target. According to one example, wind conditions may affect the speed of an assumed airborne target and hence will affect the geographic extension of the pattern. By basing the geographic extension of the pattern on the characteristics of the surrounding of the geographic position where the assumed undetected target is assumed to be situated at each point in time, a pattern which accurately presents possible geographic positions of an assumed undetected target is achieved. In addition a resource efficient method is achieved since the geographic extension of the pattern will be limited.

According to one example, the category of the assumed undetected target is one of the following: human, land borne vehicle, waterborne vehicle, or airborne vehicle.

According to one example at least one sensor of a sensor surveillance system is controlled based on the pattern.

By controlling at least one sensor of a sensor surveillance system based on the pattern formed, an efficient method to control the sensors of the system is achieved. Due to the fact that the pattern accurately describes possible geographic positions of an assumed undetected target, the sensors could according to one example scan the geographic positions covered by the pattern in order to detect a possible target in the geographic volume. The sensor does not have to focus on the geographic positions not covered by the pattern. If no target is detected in the geographic volume covered by a pattern, the pattern in that geographic volume is deleted or removed, and hence, an even smaller geographic volume will be covered by the pattern.

In addition, the method enables an improved control of the sensors of the sensor surveillance system, for example in order to avoid blind spots in a certain geographic volume of interest. More specifically the method enables a sensor surveillance system comprising a heterogeneous mix of sensors with high and low revisit rate, ranges and detection performances in different target surroundings to create detection coverage. It also gives strong support to combine passage sensors with more volume/area covering sensors in a sensor surveillance system, for example in a road crossing.

A large coverage of the sensor surveillance system scanning a geographic volume of interest may be achieved by a smaller number of sensors compared to previously known systems by using the described method. Hence, a cheaper, more accurate and resource efficient method is achieved. In addition, an efficient balancing of the threats against the sensors and sensor platforms with the sensor system search coverage may be achieved.

According to one example, a sensor of a sensor surveillance system, is controlled to scan a certain geographic volume, at least at said geographic positions in said geographic volume where a pattern of an assumed undetected target is present.

By controlling a sensor to scan a certain geographic volume where a pattern of an assumed undetected target is present, the pattern can be minimized/deleted in said geographic volume, and hence an efficient method for determining possible geographic positions of at least one assumed undetected target within a geographic volume of interest is achieved.

According to one example the method further comprises the following step: calculating a probability of the presence of an assumed undetected target for at least one part of the pattern at each point in time.

According to one aspect, each part of the pattern is associated with a certain probability, wherein said probability describes the probability that an assumed undetected target is situated in that part of the pattern. Hence, by using this method, an overview of parts of a pattern where an assumed undetected target is most likely to be situated is achieved. By using this method an accurate and reliable method for determining possible geographic positions of at least one assumed undetected target within a geographic volume of interest is achieved. In addition, the sensors of the sensor surveillance system is according to one example directed to certain geographic positions within a pattern where it is most likely that an assumed undetected target resides, and hence an efficient method to control the sensors of a sensor system surveilling a geographic volume of interest is achieved by calculating the probabilities associated with a pattern.

According to one example, the probability of the presence of one or more possible target for the at least one part of the pattern is based on: the category of the assumed undetected target; and/or the surrounding of the geographic position where the assumed undetected target was assumed to be situated at said first point in time $t_1$; and/or the ability of the sensor in the sensor surveillance system scanning a certain geographic volume to detect an assumed undetected target in said geographic volume.

According to one example, if the assumed undetected target has the category "car" which is capable of travelling on a road but also on a meadow if necessary, the probability that the car will travel on a road is according to one example larger than the probability that the car will travel on a meadow, and hence, the probability that the car is on the road is larger than the probability that the car is on the meadow. According to one example the probability calculation can be adjusted to take into account known intentions or tendencies (higher probabilities) for an assumed undetected target to move in a certain direction.

According to one example, the probability calculation takes the characteristics of the sensors of a sensor surveillance system scanning the geographic volume of interest into account, that is, the information received from the sensors scanning the geographic volume of interest is associated with a certain probability depending on the characteristics of the sensor and/or the type of surrounding surveilled by the sensor. For example, a certain type of sensor, such as a radar, gives information to the system that it has scanned a certain geographic volume and not detected any targets in said geographic volume. If the geographic volume comprises a surrounding where it is known that a radar sensor is not able to detect a target to a high level of certainty, the information from the sensor is graded as being reliable to a low degree. Hence, the probability that an assumed undetected target is existing in that particular area, even if the radar has not detected a target, is higher than if another sensor able to detect a target to a high level of certainty was scanning the same geographic volume without detecting a target.

By calculating a probability of the presence of the assumed undetected target associated to each part of the pattern for each point in time, an even more accurate and reliable decision support may be achieved, which decision to be made involves information regarding the possible geographic position of an assumed undetected target in a geographic volume of interest.

According to one example, when comparing the properties of each pattern and merging the parts of the patterns for which the comparison fulfils a predetermined criteria, the probabilities calculated for each part of each pattern is also compared. If parts of patterns are merged, that part of the pattern will according to one example be assumed to save the highest probability of each of the merged patterns in said part.

According to one example at least one sensor of a sensor surveillance system is controlled based on the calculated probability of the presence of a possible target associated with each part of the pattern at said each point in time $t_2$. By controlling the sensors of a sensor surveillance system based on the probabilities associated with each part of the pattern, an even more accurate control of the sensors of the sensor surveillance system may be achieved.

According to one example the geographic positions of a pattern for a possible target are related to a grid.

According to one example a sensor surveillance system arranged to determining possible geographic positions of at least one assumed undetected target within a geographic volume of interest is provided. The sensor surveillance system comprises: a central control unit; and at least one sensor arranged to scan and detect targets in a certain geographic volume within the geographic volume of interest, wherein said central control unit is arranged to at a first point in time $t_1$ perform the following steps: dividing the geographic volume of interest into sections; assuming the existence of an assumed undetected target at a geographic position within each section; and initiating the creation of a pattern defining at least one possible geographic position of the assumed undetected target, said pattern extends at least partially around the geographic position of the assumed undetected target; wherein the geographic extension of said pattern is determined based on: the category of the assumed undetected target; and the amount of time that has passed from the first point in time $t_1$; wherein said central control unit is arranged to at a second point in time $t_2$ perform the following steps: determining geographic locations within said geographic volume of interest from where the signals from the sensor show absence of targets; and removing the pattern from the geographic locations from where the signals from the sensor show absence of targets.

According to one example the central control unit is arranged to perform the steps mentioned above repeatedly, wherein the central control unit is further arranged to, for each further first point in time $t_{1i}$ subsequent the first point in time $t_1$, new targets are only assumed in sections along the border of the geographic volume of interest.

According to one example the central control unit is arranged to, at each point in time subsequent the first point in time $t_1$, perform the following steps: comparing the properties of each pattern; and merging the parts of the patterns for which the comparison fulfils a predetermined criteria.

According to one example, the central control unit is arranged to create a separate pattern for each category of the assumed undetected target.

According to one example the central control unit is arranged to determine blind spots within the geographic volume of interest based on the pattern.

According to one example, the central control unit is arranged to further base the geographic extension of said pattern on: the characteristics of the surrounding of the geographic position of the assumed undetected target.

According to one example the category of the assumed undetected target is one of the following: human; land borne vehicle; waterborne vehicle; or airborne vehicle.

According to one example, the central control unit is arranged to control at least one sensor of the sensor surveillance system based on the pattern.

According to one example, the central control unit is arranged to control at least one sensor of the sensor surveillance system, to scan a certain geographic volume, at least at said geographic positions where a pattern of an assumed undetected target is present.

According to one example, the central control unit is arranged to perform the following step:

calculating a probability of the presence of an assumed undetected target for at least one part of the pattern at each point in time.

According to one example, the central control unit is arranged to base the calculations of the probability of the presence of an assumed undetected target for the at least one part of the pattern on: the category of the assumed undetected target; and/or the surrounding of the geographic position where the assumed undetected target was assumed to be situated at said first point in time; and/or the ability of the sensor in the sensor surveillance system scanning a certain geographic volume to detect an assumed undetected target in said geographic volume.

According to one example, the central control unit is arranged to control at least one sensor of a sensor surveillance system based on the calculated probability of the presence of an assumed undetected target associated with each part of the pattern.

According to one example, the central control unit is arranged to relate the geographic positions of the pattern for an assumed undetected target to a grid.

BRIEF DESCRIPTION OF THE FIGURES

For a further understanding of the present invention and its further objects and advantages, the detailed description set out below should be read in conjunction with the accompanying drawings, in which the same reference notations denote similar items in the various diagrams, and in which:

FIG. 4a is a schematic flowchart of a method according to one example of the disclosure;

FIG. 4b is a schematic flowchart of a method according to one example of the disclosure.

DETAILED DESCRIPTION OF VARIOUS EMBODIMENTS

The term "link" refers herein to a communication link which may be a physical connection such as an optoelectronic communication line, or a non-physical connection such as a wireless connection, e.g. a radio link or microwave link.

Figure 1:
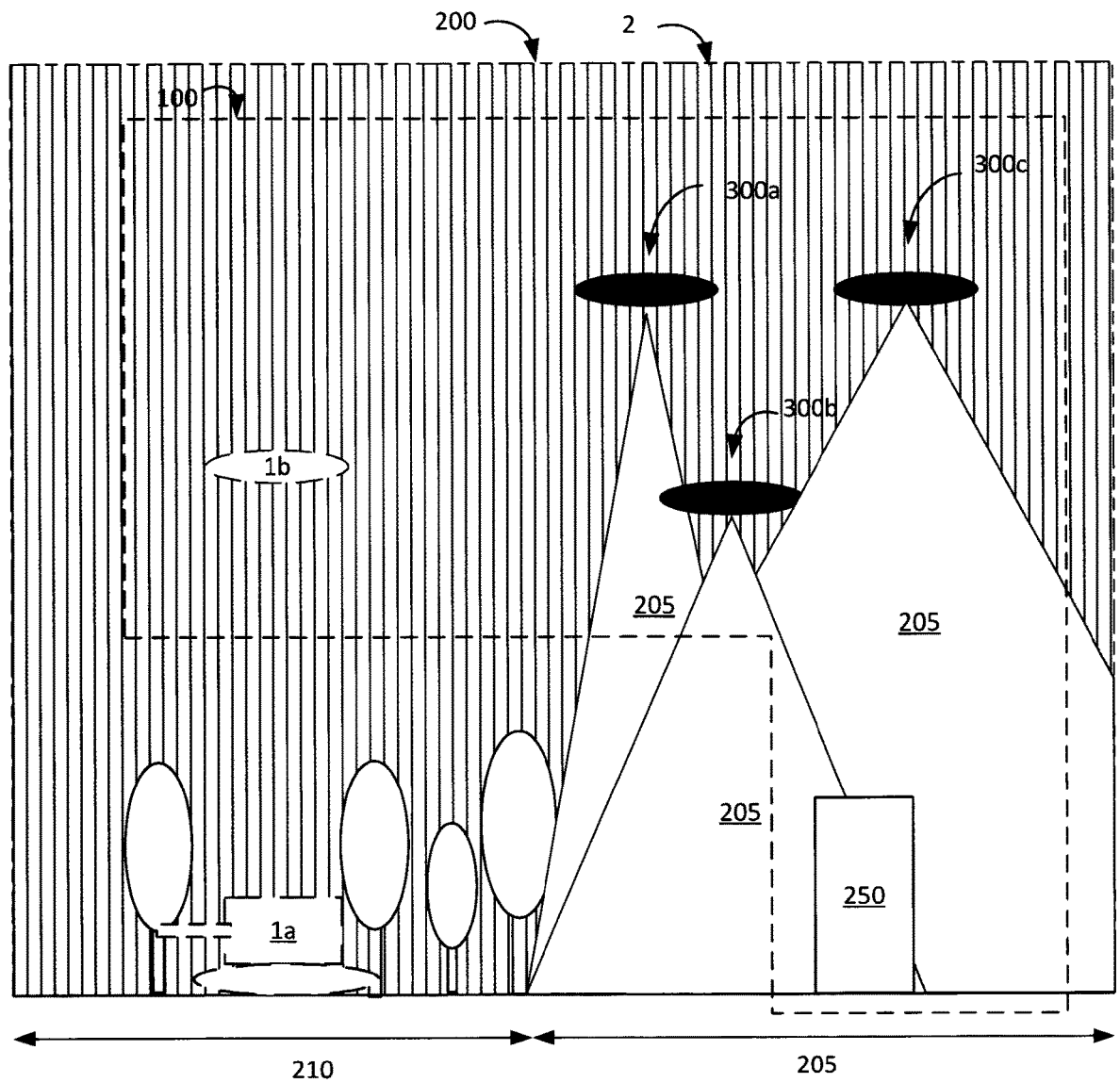
FIG. 1 illustrates an overview of a system according to one example of the disclosure.

FIG. 1 schematically illustrates a system 100 for determining possible geographic positions of at least one assumed undetected target within a geographic volume of interest 200, and an assumed undetected target 1a at a second point in time $t_2$ according to one example. The system 100 comprises sensors 300a, 300b, 300c arranged to scan at least part of a certain geographic volume of interest 200 and to detect a target in said geographic volume 200. The system 100 comprises a central control unit 250. The sensors 300a-300c are according to one embodiment of the same type, or alternatively, the sensors 300a-c are of different types. The sensors 300a-c are arranged for detecting a target in a geographic volume of interest. According to one example, the sensors 300a-c are radar sensors, optical sensors, audio sensors or other sensors arranged to detecting a target in a geographic volume of interest etc.

According to the illustrated example, the sensors 300a-300c are arranged on airborne vehicles. However, the sensors 300a-300c of the system 100 may be arranged on other vehicles such as land borne vehicles, waterborne vehicles etc. or alternatively be attached to a stationary structure such as a mast etc. According to one embodiment not illustrated, a sensor is a human.

In FIG. 1, two assumed undetected targets 1a, 1b are illustrated. In addition, a pattern 2 defining at least one possible geographic position of the assumed undetected targets 1a, 1b is schematically illustrated. The pattern 2 is illustrated for a second point in time $t_2$. The pattern 2 will vary with time. The geographic extension of the pattern 2 is based on the category of the assumed undetected targets 1a, 1b and the amount of time that has passed from a first point in time. According to one example, part of the illustrated pattern 2 is a pattern created around the illustrated target 1a and part of the pattern 2 is created around the illustrated target 1b.

In FIG. 1, the geographic locations 205 from where sensor signals show absence of targets at a second point in time $t_2$ are illustrated. The pattern 2 has been removed from these geographic locations 205. In addition, a blind spot 210 within said geographic volume of interest 200 at the second point in time $t_2$ is schematically illustrated. The blind spot 210 is determined based on the pattern 2 at each point in time. Hence, the location and size of the blind spots 210 will vary with time. According to the illustrated example, the blind spot 210 is a two dimensional geographic area. According to one example not illustrated, the blind spot is a three dimensional volume. The blind spot 210 is a geographic volume from where sensor signals are not received, or alternatively a geographic volume from where not reliable sensor signals are received. The blind spot 210 represents geographic positions within the geographic volume of interest for which no sensor signals have been received at a certain point in time. Alternatively or in addition, the blind spot 210 represents geographic positions within the geographic volume of interest for which no reliable sensor signals have been received at a certain point in time. In addition, the pattern illustrates possible geographic locations for an assumed undetected target within the geographic volume of interest.

The sensors 300a-c are arranged to be able to communicate with the central control unit 250. The central control unit 250 may be a separate stationary unit situated in for example a building. According to one embodiment, not illustrated, the central control unit 250 is situated in a vehicle such as for example an aircraft. According to one embodiment, the central control unit 250 is arranged together with one of the sensors 300a-c. The central control unit 250 is arranged to control the sensors 300a-c of the system.

Figure 2:
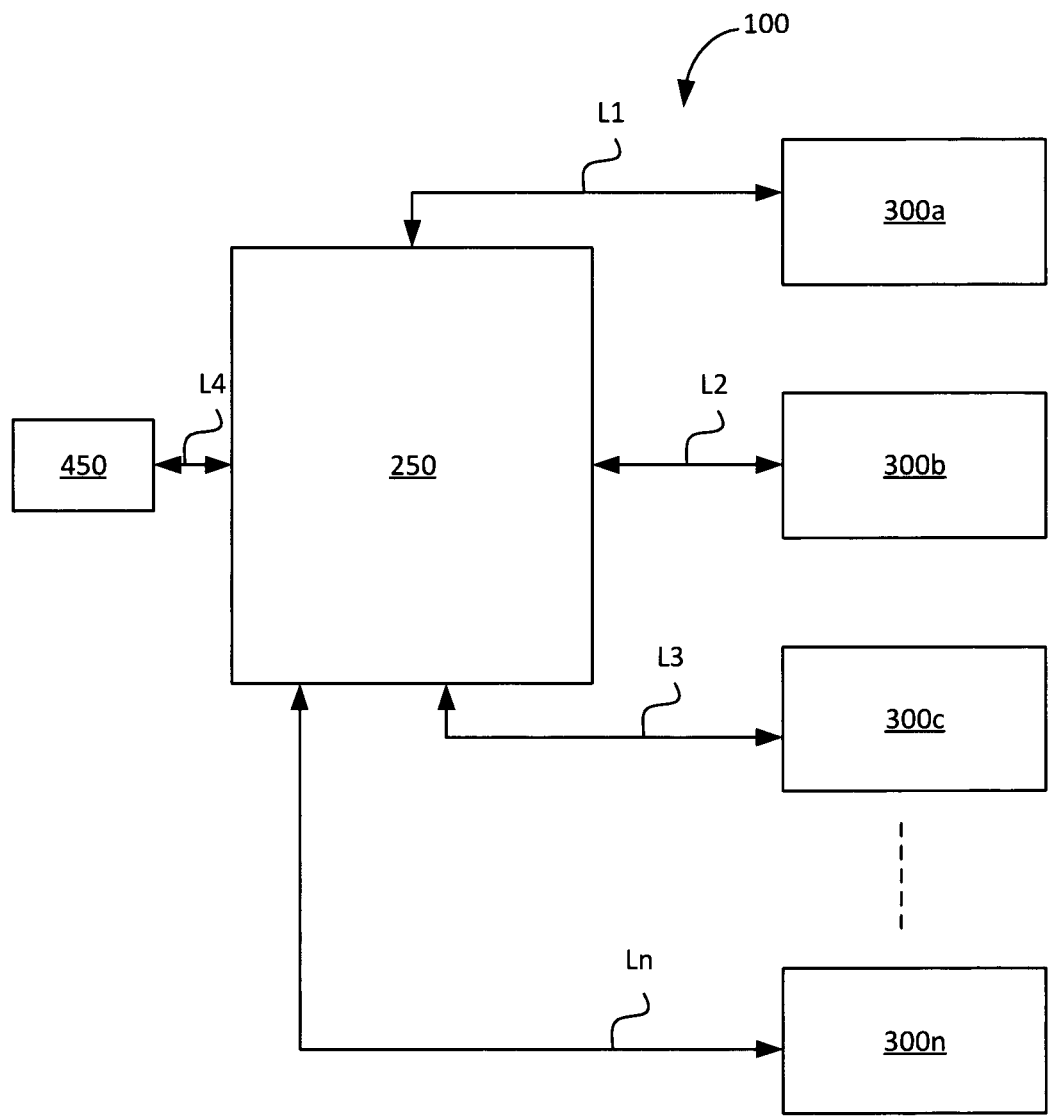
FIG. 2 illustrates an overview of a system according to one example of the disclosure.

FIG. 2 is a schematic illustration of a system 100 for determining possible geographic positions of at least one assumed undetected target 1a-n within a geographic volume of interest 200 according to one example. The system 100 comprises at least one sensor 300a-n. Each sensor 300a-n is arranged to scan a geographic volume in a geographic volume of interest 200. According to one example, the sensor 300a-n is arranged to detect and track targets in said geographic volume of interest 200. The system 100 also comprises a central control unit 250 communicatively connected to each sensor 300a-n via a sensor link L1, L2, L3, Ln. According to the illustrated example, a user interface 450 is connected to the central control unit 250 via a user interface link L4.

The sensors 300a-n are further described below. Each sensor 300a-n comprise according to one example all the functionality described below. Alternatively, at least two of the sensors 300a-c together comprise the functionality as described below, and hence, all of the features described below may not be comprised in each of the sensors 300a-n.

According to one example the sensor 300a-n, is arranged to scan a geographic volume within a certain geographic volume of interest 200. According to one example the sensor 300a-n is arranged to detect and track a target in geographic volume within the geographic volume of interest 200. The sensor 300a-n communicates with the central control unit 250 via links L1-Ln. According to one example, the sensor 300a-n sends information regarding a detected target in one part of the geographic volume of interest 200 to the central control unit 250. In addition, the sensor 300a-n sends information regarding non-detection of a target to the central control unit 250. The sensors 300a-n determines according to one example the geographic locations 205 which are scanned by the sensor 300a-n at a certain point in time. The information regarding the geographic locations 205 which are scanned by the sensor 300a-n is sent to the control unit 250. The sensors 300a-n receives, according to one embodiment, instructions from the central control unit 250 via the links L1-Ln regarding what geographic volume to scan and/or what geographic position the sensor 300a-n should be situated at.

According to one example, the sensor 300a-n comprises information regarding what type of sensor it is and/or the ability of the sensor to detect a target of a certain category, and/or the ability of the sensor to detect a target of a certain category in a certain geographic volume. According to one example, the sensor 300a-n determines the characteristics of the surrounding, such as for example water currents, visibility, terrain, wind speed etc. The characteristics of the surrounding may affect the ability of the sensor 300a-n to detect a target of a certain category in a certain geographic position.

The central control unit 250 and/or the sensors 300a-n comprise, separately or in combination: geographic location determination circuitry, surrounding characteristics determination circuitry, time difference determination circuitry, category determination circuitry, pattern creation circuitry, probability calculator circuitry and sensor controlling circuitry.

Parts of the functionality described below in relation to the central control unit 250 may be performed in one or more of the sensors 300a-n and/or in combination with the sensors 300a-n.

The central control unit 250 is arranged to, for a first point in time $t_1$ divide the geographic volume of interest 200 into sections and to assume an assumed undetected target at a geographic position within each section. In addition, the central control unit 250 is arranged to, at the first point in time $t_1$, initiate the creation of a pattern 2 defining at least one possible geographic position of the assumed undetected target 1a-n. Said pattern 2 extends at least partially around the geographic position $p_{1a-1d}$ of the assumed undetected target 1a-n. The central control unit is arranged to determine the pattern 2 based on the category of the assumed undetected target and the amount of time that has passed from the first point in time $t_1$. According to one embodiment, the pattern comprises information regarding the assumed undetected target and the category of the assumed undetected target in each part of the pattern. In addition, the parts of the pattern comprises information regarding geographic position and point in time The central control unit 250 is arranged to at a second point in time $t_2$ determine geographic locations 205 within the geographic volume of interest 200 from where sensor signals show absence of targets. According to one example the central control unit 250 determines the geographic locations 205 by means of information from the sensors 300a-n. The central control unit 250 is arranged to remove the pattern 2 from the geographic locations 205 from where sensor signals show absence of targets.

According to one example, the central control unit 250 is arranged to perform the above mentioned steps repeatedly, and for each further first point in time $t_{1i}$ subsequent the first point in time $t_1$, new sections 10 are only assumed along the border of the geographic volume of interest 200. This is due to the fact that new targets only can enter the geographic area of interest 200 via the borders. Hence, after the first point in time $t_1$ when the monitoring of the geographic volume of interest is initiated, new assumed undetected targets are only assumed along the border of the geographic volume of interest 200.

The central control unit 250 is according to one example arranged to, at each point in time subsequent the first point in time $t_1$, perform the following steps: comparing the properties of each pattern 2; and merging the parts of the patterns 2 for which the comparison fulfils a predetermined criteria. According to one example, the predetermined criteria are related to the assumed speed and/or acceleration and/or direction of movement of the assumed undetected target and/or the geographic position of the part of the pattern, in each part of the pattern. If the speed and/or acceleration and/or direction of movement of the target in two overlapping parts of the pattern agree to a certain level, the patterns are merged. Hence, according to the described method, even if two assumed undetected targets may possibly reside in a certain geographic position, only one pattern will represent the targets in said part of the pattern. Hence, according to the method, the number of possible assumed undetected targets in each part of a pattern is irrelevant, the pattern discloses the possibilities than an assumed undetected target may reside in a geographic position regardless of the number of assumed undetected targets of a certain category that may reside in that position.

The central control unit is according to one example arranged to create a separate pattern for each category of the assumed undetected target 1*a-n*. The pattern for one assumed undetected target category will be different from a pattern for a different assumed undetected target category due to a number of factors such as the possible speed and/or acceleration of the assumed undetected target, etc.

According to one embodiment, the central control unit is arranged to determine blind spots 205 within the geographic volume of interest 200 based on the pattern 2. The blind spots 205 represent according to one example an overview of the sensor coverage of a certain geographic volume of interest 200. The blind spots 205 represent according to one example a geographic volume from which no sensor signals are received. In other words, the blind spots 205 represent a geographic volume not covered by the sensor surveillance system 100 at a certain point in time. The size, position and numbers of blind spots 205 will vary with time. According to one example, the control unit 250 is arranged to control the sensors of a sensor surveillance system based on the blind spots 205. According to one example, a blind spot 205 is formed by the volume of area which is not covered by the sensor system, which volume or area is surrounded or enclosed by a pattern 2.

The central control unit 250 is according to one example arranged to further base the geographic extension of the pattern 2 on the characteristics of the surrounding of the geographic position of the assumed undetected target 1*a-n* at each point in time.

The central control unit 250 is according to one embodiment arranged to derive further information regarding the assumed undetected target based on the category of the assumed undetected target 1*a-n*. Such further information is for example the maximum/minimum speed of the assumed undetected target 1*a-n*, the maximum/minimum acceleration of the assumed undetected target 1*a-n*, the direction of movement of the assumed undetected target, the ability of the assumed undetected target 1*a-n* to move in a certain terrain etc.

The further information regarding the assumed undetected target is according to one example stored in the control unit 250 and/or in the sensors 300*a-n* of the system 100. According to one example, the category of the assumed undetected target 1*a-n* is associated with a certain speed and/or acceleration of an assumed undetected target.

The central control unit 250 is arranged to create a pattern 2 defining at least one possible geographic position of the assumed undetected target 1*a-n*, said pattern 2 extending at least partially around the geographic position $p_{1a-1d}$ of the assumed undetected target 1*a-n* at the first point in time $t_1$.

Information regarding the determined geographic locations 205 from where sensor signals are received at said second point in time $t_2$ is derived from the sensors 300*a-n* and/or from central control unit 250, possibly in combination with data from an external unit not illustrated.

According to one example, the time difference between the first point in time $t_1$ and the second point in time $t_2$ is determined by the central control unit 250. The time difference between first point in time $t_1$ and the second point in time $t_2$ affects the geographic extension of the pattern 2 at said second point in time $t_2$. The pattern 2 illustrates at least one possible geographic position of the assumed undetected target 1*a-n*. According to one example the assumed undetected target 1*a-n* moves, and hence the period of time between the first point in time $t_1$ and $t_2$ during which the assumed undetected target 1*a-n* moves affects the pattern 2. If the time period between $t_1$ and $t_2$ is large, an assumed undetected target 1*a-n* could have moved a long distance, and hence, the pattern 2 may cover a large geographic volume. If the time period between $t_1$ and $t_2$ is small, the assumed undetected target 1*a-n* could only have moved a short distance, and hence, the pattern 2 covers a small geographic volume. In addition, the category of the assumed undetected target 1*a-n* defines according to one example the maximum/minimum velocity and/or maximum/minimum acceleration at which the assumed undetected target 1*a-n* is able to move. The maximum/minimum velocity and/or maximum/minimum acceleration of the assumed undetected target 1*a-n* affects together with the time difference between $t_1$ and $t_2$ the geographic extension of the pattern 2 at the second point in time $t_2$.

The central control unit 250 is further arranged to determine geographic locations 205 from where sensor signals are received at the second point in time $t_2$. In addition or alternatively, the central control unit 250 is arranged to analyse the sensor signals received at the second point in time $t_2$. The geographic locations 205 from where sensor signals are received at the second point in time $t_2$ and/or the type of sensor signals received at the second point in time $t_2$ affects according to one example the pattern 2. As mentioned above, the pattern 2 defines possible geographic positions of the assumed undetected target 1*a-n*. The central control unit is arranged to remove the pattern 2 from the geographic locations 205 from where sensor signals show absence of targets.

According to one example, if a geographic location 205 is being scanned by a sensor 300*a-n* at $t_2$, the pattern 2 is removed from said geographic location 205 if the sensor signals from that geographic location 205 show absence of targets. According to one example, the central control unit 250 is arranged to communicate with at least one external unit (not illustrated).

According to one example, the central control unit 250 is arranged to retrieve further information based on the category of the assumed undetected target 1*a-n* such as the ability of a certain assumed undetected target 1*a-n* to move in a certain terrain, maximum/minimum speed of a certain assumed undetected target 1*a-n* in a certain terrain etc. from said external unit. Said external unit comprise according to one example a database with further information regarding the surrounding of an assumed undetected target 1*a-n* such as: geographic information, weather information, water current information etc. According to one example, the central control unit 250 comprises some or all of the information as mentioned above.

The central control unit 250 is according to one example connected to a user interface 450. The user interface 450 is according to one example arranged to receive or present data or instructions from/to a user. According to one example, a user can control a sensor 300a-n of the system 100 via the user interface 450.

According to one example, the central control unit 250 controls the sensors 300a-n. According to one example, the central control unit 250 controls the sensors 300a-n based on the created pattern 2 and/or blind spots 210. According to one example, the central control unit 250 controls the sensors 300a-c based on the created pattern 2 in order to minimize said pattern 2. According to one example, the central control unit 250 is arranged to plan routes and sensor scan angles for each sensor 300a-n of the sensor surveillance system 100 based on the patter 2 and/or blind spots 210.

For example, if a pattern is covering a certain geographic volume, the control unit 250 controls a sensor 300a-n to move to a position where the sensor 300a-n is able to scan said geographic volume. If the sensor signals from that geographic position show absence of targets, the pattern 2 in said geographic volume is removed since the sensor 300a-n is able to eliminate possible geographic positions of an assumed undetected target in said geographic volume.

According to one example, the central control unit 250 is arranged to cooperate with another central control unit (not illustrated) comprised in a sensor surveillance system scanning another geographic volume of interest (not illustrated), for example a geographic volume of interest adjacent the geographic volume of interest 200 which is scanned by the sensor surveillance system 100. The central control unit 250 may exchange patterns 2 with the other central control unit, for example along the border of the geographic volume of interest 200.

According to one example, the blind spot 205 determination is performed by one or several of the sensors 300a-n. According to another example the blind spot 205 determination is performed by the central control unit 250. According to another example, the blind spot determination is performed by a combination of at least one sensor 300a-n and the central control unit 250.

According to one example the central control unit 250 determines a time schedule for each sensor 300a-n. Said time schedule comprises according to one example a route and/or sensor scan angles and/or and a time plan regarding what geographic positions in the geographic volume of interest the sensor 300a-n is controlled to scan during which time intervals.

According to one example, the central control unit 250 determines the first point in time $t_1$. According to one example, a user determines the first point in time $t_1$ for example via the user interface 450. According to one example, the sensor 300a-n determines the first point in time $t_1$.

Further, the central control unit 250 is according to one example arranged to: determining geographic locations 205 within said geographic volume of interest 200 from where sensor signals show absence of target.

According to one example, the central control unit 250 determines the geographic locations 205 from where sensor signals are received by analysing the signals received from the sensors 300a-n in the system 100. Alternatively or in addition, the sensor signals received are analysed further in order to determine the reliability of the sensor signals. The central control unit 250 is further arranged to determining blind spots 210 within said geographic volume of interest 200 based on the pattern 2.

According to one example, a sensor 300a-n of a certain type is able to detect a target of a certain type in a certain surrounding. If no target is detected in geographic locations 205 scanned by the sensor 300a-n, there are two possible scenarios: either there exists no target in the geographic volume, or a target exists in the geographic volume, but the sensor 300a-n could not detect the target. Hence, if a sensor 300a-n does not detect a target in a geographic location, the geographic location may according to one example still possibly reside an assumed undetected target 1a-n. Hence, according to one example, the type of sensor 300a-n scanning a geographic location 205 and the circumstances at the time, where such circumstances comprises weather conditions, visibility, currents, terrain etc. affect sensor signals. According to one example the sensor signals show absence of targets in a geographic location only when a predetermined condition is fulfilled. Said predetermined condition could for example involve: type of sensor, scanning a geographic location 205 and the circumstances at the time, where such circumstances comprises weather conditions, visibility, currents, terrain. When an absence of targets can be determined to a certain degree of certainty, the sensor signals are determined to show absence of targets.

According to one example, the central control unit 250 is arranged to create a pattern 2, further based on the characteristics of the surrounding of the geographic position $p_{1a-n}$ of the assumed undetected target 1a-n at each point in time. The central control unit 250 is arranged to derive information regarding the surrounding of the geographic position where the assumed undetected target is assumed to reside, for example from an external unit and/or from a database in or in connection with the central control unit 250. The characteristics of the surrounding of the geographic position affect according to one example the assumed undetected target's 1a-n ability to move in said surrounding. The velocity/acceleration at which an assumed undetected target 1a-n is able to move in a certain surrounding affects the distance the assume target 1a-n is able to travel during a certain period of time. Hence, the pattern 2 is affected by the surrounding terrain.

According to one example, the control unit 250 is arranged to control at least one sensor 300a-n of the sensor surveillance system 100 based on the pattern 2. According to one example, the sensors 300a-n of the sensor surveillance system 100 are controlled to scan geographic volumes covered by a pattern 2 in order to minimize said pattern 2. According to one example, a sensor 300a-n of a certain type able to determine assumed undetected targets 1a-n of a specific category and/or able to determine assumed undetected targets 1a-n of a specific category in a specific surrounding, is controlled to scan a certain geographic volume in order to be able to minimize the pattern 2.

According to one embodiment, the central control unit 250 assumes a category of a target in a section 10 depending on the characteristics of the section 10 and/or the surrounding of the section 10. For example, if a section 10 is surrounded by mountains, the category of an assumed undetected target 1a-n will be a category which is able to transport itself to the section 10.

According to one embodiment, the central control unit 250 is arranged to calculate a probability for each part 50 of the pattern 2 at each point in time. The calculated probability defines the probability that the assumed undetected target 1a-n is situated at that specific part at said point in time. Many factors affect the probability of the presence of an assumed undetected target 1a-n in part 50 of the pattern. The central control unit 250 is arranged to base the probability calculations on: the category of the assumed undetected target 1a-n; and/or the surrounding of the geographic position where the assumed undetected target 1a-n is assumed to be situated at each point in time; and/or the ability of the sensor 300a-n in the sensor surveillance system scanning a certain geographic volume to detect an assumed undetected target 1a-n in said geographic volume. According to one example, the probability calculations are based on intentions and treats or the assumed undetected target 1a-n.

According to one example, if the assumed undetected target 1a-n is categorized as a car which is capable of travelling on a road but also on a meadow if necessary, the probability that the car will travel on a road may according to one example be larger than the probability that the car will travel on a meadow, and hence, the probability that the car is on the road is larger than the probability that the car is on the meadow.

According to one example the calculations of the probabilities of an assumed undetected target's existence in each part of the pattern 2 where the probabilities are connected to the sensor detection process are updated separately from the calculation of the probabilities of an assumed undetected target's existence in each part of the pattern 2 where the probabilities are connected to the target such as intentions and treats. In this way it is possible to handle targets that act differently than expected. According to one example the probabilities connected to the assumed undetected target is presented to a user via the user interface 450.

The central control unit 250 is according to one example arranged to control at least one sensor 300a-n of the sensor surveillance system 100 based on the calculated probability of the presence of an assumed undetected target 1a-n associated with each part 50 of the pattern 2 at said second point in time $t_2$. According to one example, a sensor 300a-n is controlled to scan a geographic volume wherein it is most likely i.e. where it is most probable that an assumed undetected target 1a-n could reside.

According to one example, the central control unit 250 and/or the sensor 300a-n is arranged to calculate a probability of the presence of the target 1a-n associated with each part of the pattern at each point in time.

According to one example, the central control unit 250 is arranged to relate the geographic positions of a pattern for an assumed undetected target 1a-n to a grid. A grid enables a user friendly presentation of a pattern 2. According to one example, a certain number of grid sections correspond to the sections 10 of the geographic volume of interest 200.

According to one embodiment, any number of sensors 300a-n and/or any types of sensors able to detect a target in a geographic volume of interest 200 can be included in the system 100.

Figure 3A:
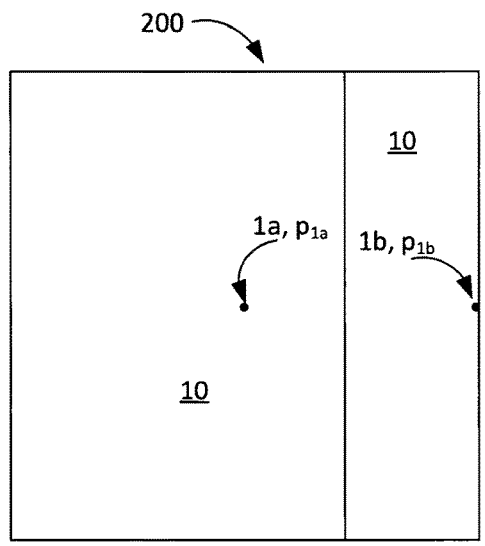
FIG. 3a illustrates a view of a geographic volume of interest according to one example of the disclosure.

FIG. 3a illustrates a view of a geographic volume of interest 200 at a first point in time $t_1$. The geographic volume of interest 200 is illustrated in two dimensions. The geographic volume of interest 200 is divided into sections 10. The sections 10 may have different dimensions depending on a number of factors such as terrain of the geographic location and/or position in relation to a border of the geographic volume of interest. For each section 10, an assumed undetected target 1a, 1b is assumed to be positioned in a geographic position within the section 10. According to one example, the geographic positions are selected to be situated at the centre of each section 10. According to one example not illustrated, the geographic position is selected to be situated at a suitable position within the section 10 depending on a number of factors, such as category of the assumed undetected target 1a-b, the characteristics of the section 10 etc.

Figure 3B:
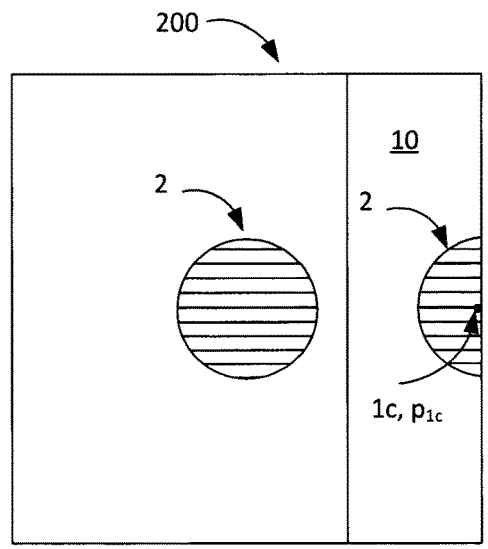
FIG. 3b illustrates a view of a geographic volume of interest according to one example of the disclosure.

FIG. 3b illustrates a two dimensional view of a geographic volume of interest 200 at a second point in time $t_2$.

As illustrated, a pattern 2 for each assumed undetected target 1a, 1b illustrated in FIG. 3a has been generated. In addition, at the second point in time $t_2$, which also defines a further first point in time $t_{1f}$, a new section 10 has been assumed along the border of the geographic volume of interest 200. A new assumed undetected target 1c has been assumed in said section 10.

Figure 3C:
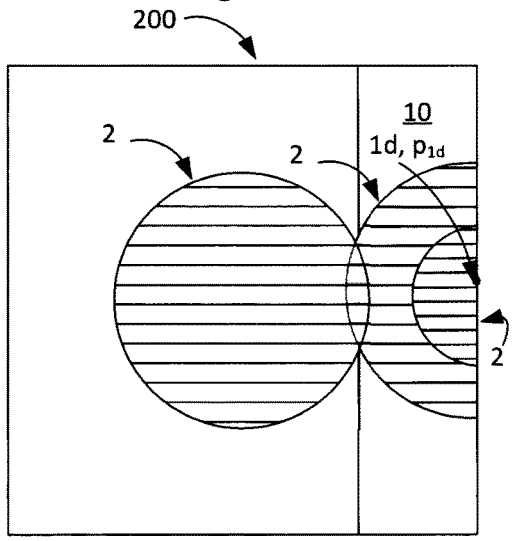
FIG. 3c illustrates a view of a geographic volume of interest according to one example of the disclosure.

FIG. 3c illustrates a two dimensional view of a geographic volume of interest 200 at a further second point in time $t_{2f}$ occurring after the second point in time $t_2$ defined in relation to FIG. 3b. At the further second point in time $t_{2f}$ which also defines a further first point in time $t_{1f}$, a new section 10 has been assumed along the border of the geographic volume of interest 200. A new assumed undetected target 1d has been assumed in said section 10. As illustrated, the pattern 2 for each assumed undetected target 1a, 1b, 1c illustrated in FIG. 3b has increased further since more time has passed from the first point in time $t_1$. In addition, a pattern 2 has been generated around the assumed undetected target 1c. As can be seen, the patterns from the assumed undetected targets 1a, 1b, and 1c overlap.

Figure 3D:
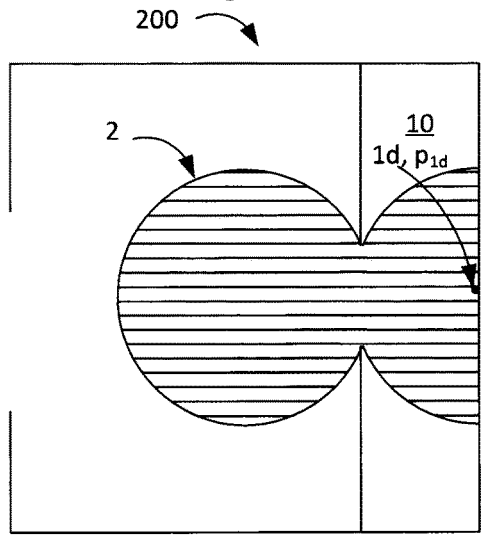
FIG. 3d illustrates a view of a geographic volume of interest according to one example of the disclosure.

FIG. 3d illustrates a two dimensional view of a geographic volume of interest 200 at the further second point in time $t_{2f}$ occurring after the second point in time $t_2$ defined in relation to FIG. 3b, that is, at the same point in time as illustrated in FIG. 3c. As can be seen, the patterns 2 from the assumed undetected targets 1a, 1b illustrated in FIG. 3a have been merged in the overlapping parts since a comparison of the two patterns in the overlapping parts have fulfilled predetermined criteria. In addition, the pattern from the new assumed undetected target 1c has been merged with the pattern 2.

Figure 3E:
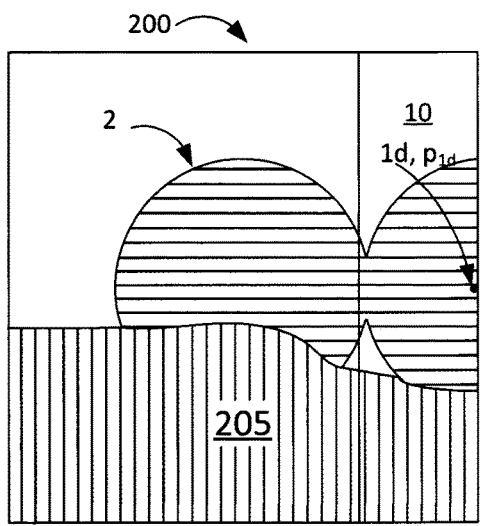
FIG. 3e illustrates a view of a geographic volume of interest according to one example of the disclosure.

FIG. 3e illustrates a two dimensional view of a geographic volume of interest 200 at the further second point in time $t_{2f}$ occurring after the second point in time defined in relation to FIG. 3b, that is, at the same point in time as illustrated in FIG. 3c and FIG. 3d. As can be seen, geographic locations 205 from where sensor signals show absence of targets at said further second point in time $t_{2f}$ are illustrated.

Figure 3F:
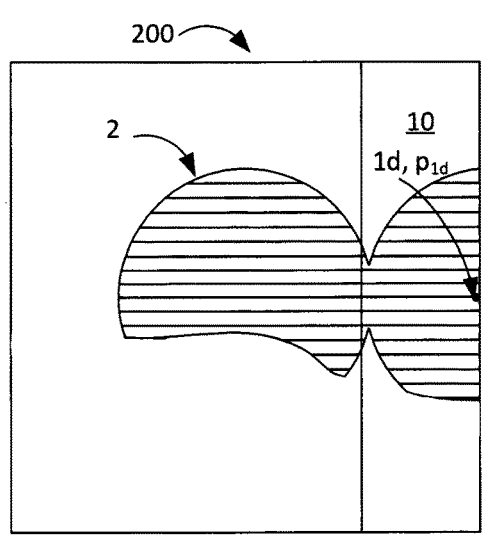
FIG. 3f illustrates a view of a geographic volume of interest according to one example of the disclosure.

FIG. 3f illustrates a two dimensional view of a geographic volume of interest 200 at the further second point in time $t_{2f}$ occurring after the second point in time defined in relation to FIG. 3b, that is, at the same point in time as illustrated in FIG. 3c-e. As can be seen, the patterns 2 have been removed from the geographic locations from where sensor signals show absence of signals 205.

Figure 3G:
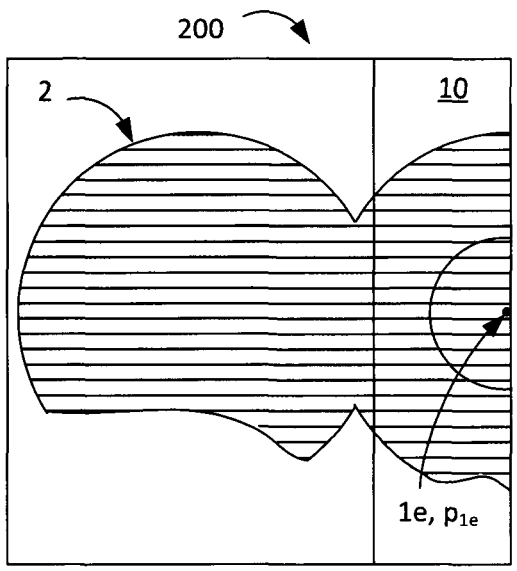
FIG. 3g illustrates a view of a geographic volume of interest according to one example of the disclosure.

FIG. 3g illustrates a two dimensional view of a geographic volume of interest 200 at a further second point in time $t_{2ff}$ occurring after the further second point in time $t_{2f}$ as illustrated in FIG. 3c-f. As can be seen, the geographic extension of the patterns 2 has increased compared to the geographic extension of the pattern 2 at said further second point in time $t_{2f}$. The pattern 2 created around the new assumed undetected target 1d is illustrated as a half circle. This pattern 2 has not been merged with the other pattern 2. In addition, at the further second point in time $t_{2ff}$ which also defines a further first point in time $t_{1f}$, a new section 10 has been assumed along the border of the geographic volume of interest 200. A new assumed undetected target 1e has been assumed in said section 10.

Figure 3H:
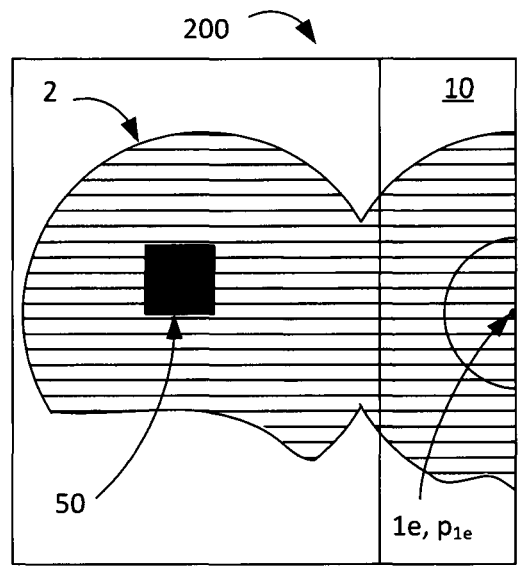
FIG. 3h illustrates a view of a geographic volume of interest according to one example of the disclosure.

FIG. 3h illustrates a two dimensional view of a geographic volume of interest 200 at a the further second point in time $t_{2ff}$ as also illustrated in FIG. 3g. In addition, a part 50 of the pattern 2 is schematically illustrated. The probability of the presence of an assumed undetected target 1a-n has been calculated for this specific part 50 of the pattern 2.

FIG. 4a schematically illustrates a method for determining possible geographic positions of at least one assumed undetected target $1a$-$n$ within a geographic volume of interest 200. In a first step S1 a method for determining possible geographic positions of at least one assumed undetected target $1a$-$n$ within a geographic volume of interest 200 is performed. At a first point in time $t_1$ the following steps are performed: dividing the geographic volume of interest 200 into sections 10; assuming the existence of an assumed undetected target $1a$-$n$ at a geographic position $p_{1a\text{-}1d}$ within each section 10; and initiating the creation of a pattern 2 defining at least one possible geographic position of the assumed undetected target $1a$-$n$, said pattern 2 extends at least partially around the geographic position $p_{1a\text{-}1d}$ of the assumed undetected target $1a$-$n$. The geographic extension of said pattern 2 is determined based on: the category of the assumed undetected target $1a$-$n$; and the amount of time that has passed from the first point in time $t_1$. The method further comprises to at a second point in time $t_2$ perform the following steps: determining geographic locations 205 within said geographic volume of interest 200 from where sensor signals show absence of targets; and removing the pattern 2 from the geographic locations 205 from where sensor signals show absence of targets.

FIG. 4b schematically illustrates a method for determining possible geographic positions of at least one assumed undetected target $1a$-$n$ within a geographic volume of interest 200, according to one example of the present disclosure.

In a first step, M1, at a first point in time $t_1$, the geographic volume of interest 200 is divided into sections 10. According to one example, the sections 10 have a predetermined size. According to one example, the size of the sections 10 varies, for example depending on the geographic location and/or the terrain of said section and/or neighbouring sections.

After the method step M1 a subsequent method step M2 is performed.

In a second step, M2 the existence of an assumed undetected target $1a$-$n$ at a geographic position $p_{1a\text{-}n}$ within each section is assumed.

After the method step M2 a subsequent method step M3 is performed.

In a third step M3, at the first point in time $t_1$ the creation of a pattern 2 is initiated. The pattern 2 defines at least one possible geographic position of the assumed undetected target $1a$-$n$ and extends at least partially around the geographic position $p_{1a\text{-}d}$ of the assumed undetected target $1a$-$n$. The geographic extension of the pattern 2 is determined based on the category of the assumed undetected target $1a$-$n$, and the amount of time that has passed from the first point in time $t_1$. According to one example, one pattern 2 is created for each category of the assumed undetected target $1a$-$n$.

After the method step M3 a subsequent method step M4 is performed.

In a forth step M4, at the second point in time $t_2$ geographic locations 205 within said geographic volume of interest 200 from where sensor signals show absence of targets are determined.

After the method step M4 a subsequent method step M5 is performed.

In a fifth step M5, at the second point in time $t_2$ the pattern in removed from the geographic locations 205 from where sensor signals show absence of targets. Hence, at the second point in time $t_2$, information from the sensors are utilized in order to optimize the pattern by removing parts of the pattern which are not relevant, that is, parts in which an assumed undetected target is not assumed to reside. The above mentioned steps are performed repeatedly. For each further first point in time $t_{1i}$ subsequent the first point in time $t_1$, new sections are only assumed along the border of the geographic volume of interest. Hence, new assumed undetected targets $1a$-$n$ will only be assumed along the border of the geographic volume of interest 200 at each subsequent point in time after the first point in time $t_1$.

After the method step M5 a subsequent method step M6 is performed.

In a sixth step, M6, at each point in time subsequent the first point in time $t_1$, the properties of each pattern 2 is compared, and the parts 50 of the patterns that compare according to predetermined criteria are merged.

After the method step M6 a subsequent method step M7 is performed.

In a seventh step, M7, blind spots 210 within the geographic volume of interest 200 are determined based on the pattern 2. According to one example, the blind spots 210 present geographic volumes within the geographic volume of interest 200 which are not covered or scanned by the sensors of a sensor surveillance system 100.

After the method step M7 a subsequent method step M8 is performed.

In an eight step, M8, the probability of the presence of an assumed undetected target $1a$-$n$ for at least one part 50 of the pattern 2 at each point in time is performed. The probability of the presence of an assumed undetected target $1a$-$n$ for the at least one part 50 of the pattern 2 is according to one example based on: the category of the assumed undetected target $1a$-$n$; and/or the surrounding of the geographic position $p_{1a\text{-}n}$ where the assumed undetected target $1a$-$n$ is assumed to be situated at each point in time; and/or the ability of the sensor $300a$-$n$ in the sensor surveillance system scanning a certain geographic volume to detect an assumed undetected target $1a$-$n$ in said geographic volume.

After the method step M8 a subsequent method step M9 is performed.

The method steps M6-M8 may be performed in an arbitrary order, and hence, these method steps do not have to be performed in the order listed in FIG. 4b. In a ninth step, M9, at least one sensor $300a$-$n$ of the sensor surveillance system 100 is controlled based on the pattern 2 and/or the blind spots 210 and/or the calculated probability of the presence of an assumed undetected target $1a$-$n$ for at least one part 50 of the pattern 2 at each point in time. According to one example, at least one sensor is controlled to scan a geographic volume where a pattern 2 is present.

After the step M9 the method is ended/returned.

At least one of the method steps M5-M9 may be omitted according to an example of the inventive method. According to one example the method step M6-M8 may be performed at a desired order, not necessarily in the illustrated order.

Figure 5:
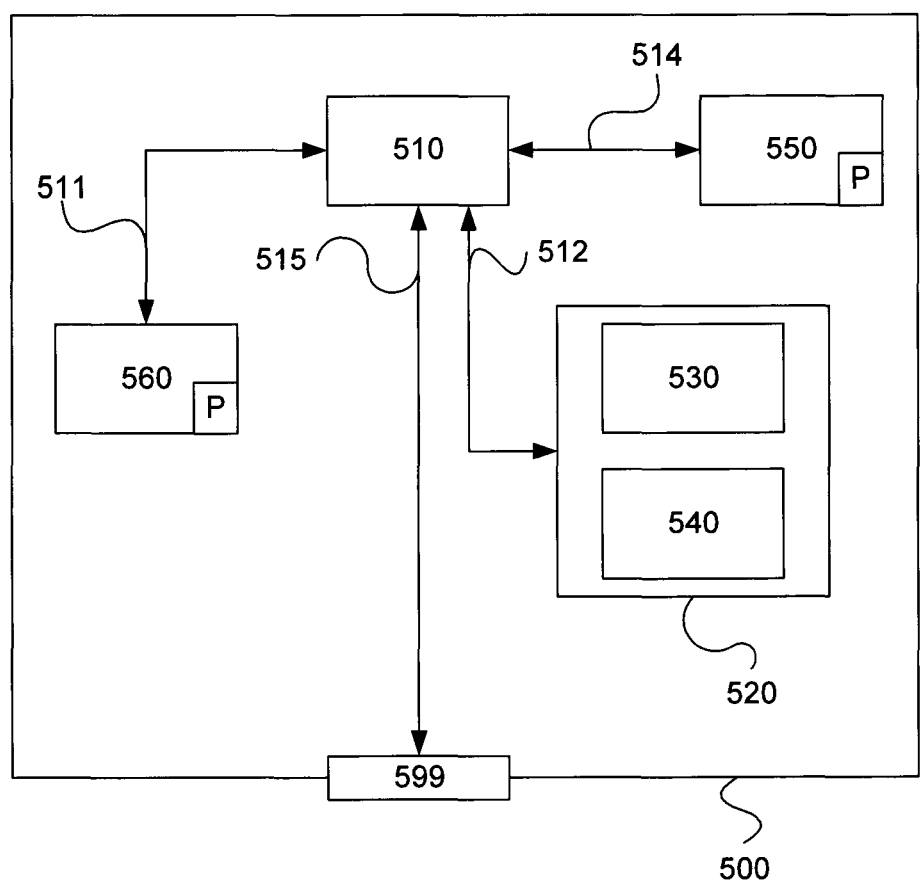
FIG. 5 schematically illustrates a computer according to an embodiment of the invention.

FIG. 5 is a diagram of one version of a device 500. The control units 250 described with reference to FIG. 2 may in one version comprise the device 500. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

The computer program P comprises routines for determining possible geographic positions of at least one assumed undetected target 1*a-n* within a geographic volume of interest 200.

The computer program P may comprise routines for performing any of the process steps detailed with reference to FIG. 4*b*.

The program P may be stored in an executable form or in compressed form in a memory 560 and/or in a read/write memory 550.

Where it is stated that the data processing unit 510 performs a certain function, it means that it conducts a certain part of the program which is stored in the memory 560 or a certain part of the program which is stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit via a data bus 511. The read/write memory 550 is arranged to communicate with the data processing unit 510 via a data bus 514. The links L210, L230, L231, L233, L237, L243 and L253, for example, may be connected to the data port 599.

When data are received on the data port 599, they are stored temporarily in the second memory element 540. When input data received have been temporarily stored, the data processing unit 510 will be prepared to conduct code execution as described above.

Parts of the methods herein described may be conducted by the device 500 by means of the data processing unit 510 which runs the program stored in the memory 560 or the read/write memory 550. When the device 500 runs the program, method steps and process steps herein described are executed.

The foregoing description of the preferred embodiments of the present invention is provided for illustrative and descriptive purposes. It is not intended to be exhaustive, or to limit the invention to the variants described. Many modifications and variations will obviously suggest themselves to one skilled in the art. The embodiments have been chosen and described in order to best explain the principles of the invention and their practical applications and thereby make it possible for one skilled in the art to understand the invention for different embodiments and with the various modifications appropriate to the intended use.

The components and features specified above may within the framework of the invention be combined between different embodiments specified.

The invention claimed is:

1. A method for determining possible geographic positions of at least one assumed undetected target within a geographic volume of interest, the method comprising:
for a first point in time $t_1$,
dividing, by at least one processor, the geographic volume of interest into sections;
assuming, by the at least one processor, an existence of an assumed undetected target at a geographic position within each section of the sections; and
initiating, by the at least one processor, creation of a pattern defining at least one possible geographic position of the assumed undetected target, wherein the pattern geographically extends at least partially around the geographic position of the assumed undetected target;
wherein the geographic extension of the pattern is determined based on:
a category of the assumed undetected target; and
an amount of time that has passed from the first point in time $t_1$; and
for a second point in time $t_2$,
determining, by the at least one processor, geographic locations within the geographic volume of interest from where sensor signals show absence of targets; and
removing, by the at least one processor, the pattern from the geographic locations from where sensor signals show absence of targets;
wherein at least one sensor of a sensor surveillance system is controlled based on the pattern.

2. The method according to claim 1, wherein the method is performed repeatedly, and for each further first point in time $t_{1i}$ subsequent the first point in time $t_1$, new sections are only assumed along a border of the geographic volume of interest.

3. The method according to claim 1, further comprising:
at each point in time subsequent the first point in time $t_1$,
comparing properties of each pattern; and
merging parts of those patterns for which a comparison fulfils a predetermined criteria.

4. The method according to claim 1, wherein a separate pattern is created for each category of the assumed undetected target.

5. The method according to claim 1, wherein blind spots within the geographic volume of interest are determined based on the pattern.

6. The method according to claim 1, wherein the geographic extension of the pattern is further based on characteristics of surroundings of the geographic position of the assumed undetected target at each point in time.

7. The method according to claim 1, wherein the category of the assumed undetected target is one of a human, a land borne vehicle, a waterborne vehicle, or an airborne vehicle.

8. The method according to claim 1 wherein at least one sensor of the sensor surveillance system is controlled to scan a certain geographic volume at least at those geographic positions where the pattern of the assumed undetected target is present.

9. The method according to claim 1, further comprising: calculating a probability of a presence of the assumed undetected target for at least one part of the pattern at each point in time.

10. The method according to claim 9, wherein the probability of the presence of the assumed undetected target for the at least one part of the pattern is based on at least one of:
the category of the assumed undetected target;
surroundings of the geographic position where the assumed undetected target is assumed to be situated at each point in time; or
an ability of the sensor in the sensor surveillance system scanning a certain geographic volume to detect the assumed undetected target in the geographic volume.

11. The method according to a claim 10 wherein at least one sensor of the sensor surveillance system is controlled based on the probability of the presence of an assumed undetected target associated with each part of the pattern.

12. The method according to claim 1, wherein geographic positions of a pattern for an assumed undetected target are related to a grid.

13. A sensor surveillance system configured for determining possible geographic positions of at least one assumed undetected target within a geographic volume of interest, the system comprising:

a central control unit comprising at least one processor; and
at least one sensor arranged to scan and detect targets in a certain geographic volume within the geographic volume of interest,
wherein the central control unit is arranged to perform: at a first point in time $t_1$,
 dividing the geographic volume of interest into sections;
 assuming an existence of an assumed undetected target at a geographic position within each section of the sections; and
 initiating a creation of a pattern defining at least one possible geographic position of the assumed undetected target, wherein the pattern geographically extends at least partially around the geographic position of the assumed undetected target; and
wherein the geographic extension of the pattern is determined based on:
 a category of the assumed undetected target; and
 an amount of time that has passed from the first point in time $t_1$; and
at a second point in time $t_2$,
 determining geographic locations within the geographic volume of interest (200) from where signals from the sensor show absence of targets; and
 removing the pattern from those geographic locations from where the signals from the sensor show absence of targets;
wherein the central control unit is arranged to control at least one sensor of the sensor surveillance system based on the pattern.

14. The sensor surveillance system according to claim 13, wherein the central control unit is arranged to perform repeatedly, and wherein, for each further first point in time $t_{1i}$ subsequent the first point in time $t_1$, new sections are only assumed along a border of the geographic volume of interest.

15. The sensor surveillance system according to claim 13, wherein the central control unit is arranged for performing, at each point in time subsequent the first point in time $t_1$:
 comparing properties of each pattern; and
 merging parts of the patterns for which a comparison fulfils a predetermined criteria.

16. The sensor surveillance system according to claim 13, wherein the central control unit is configured to create a separate pattern for each category of the assumed undetected target.

17. The sensor surveillance system according to claim 13, wherein the central control unit is configured to determine blind spots within the geographic volume of interest based on the pattern.

18. The sensor surveillance system according to claim 13, wherein the central control unit is arranged to further base the geographic extension of the pattern on characteristics of surroundings of the geographic position of the assumed undetected target at each point in time.

19. The sensor surveillance system according to claim 13, wherein the category of the assumed undetected target is one a human, a land borne vehicle, a waterborne vehicle, or an airborne vehicle.

20. The sensor surveillance system according to claim 13, wherein the central control unit is arranged to control at least one sensor of the sensor surveillance system to scan a certain geographic volume at least at those geographic positions where a pattern of an assumed undetected target is present.

21. The sensor surveillance system according to claim 13, wherein the central control unit is arranged for performing: calculating a probability of a presence of an assumed undetected target for at least one part of the pattern at each point in time.

22. The sensor surveillance system according to claim 21, wherein the central control unit is arranged to base calculations of the probability of the presence of the assumed undetected target for the at least one part of the pattern on at least one of:
 the category of the assumed undetected target;
 surroundings of the geographic position where the assumed undetected target was assumed to be situated at the first point in time $t_1$, $t_{1i}$; or
 an ability of the sensor in the sensor surveillance system scanning a certain geographic volume to detect the assumed undetected target in the geographic volume.

23. The sensor surveillance system according to claim 21, wherein the central control unit is arranged to control at least one sensor of a sensor surveillance system based on the probability of the presence of the assumed undetected target associated with each part of the pattern.

24. The sensor surveillance system according to claim 13, wherein the central control unit is arranged to relate geographic positions of the pattern for the assumed undetected target to a grid.

* * * * *